United States Patent
Tragesser et al.

(10) Patent No.: US 12,503,656 B2
(45) Date of Patent: Dec. 23, 2025

(54) FLUIDIZATION OF CATALYST IN LATERAL SECTIONS OF A SYSTEM

(71) Applicant: KELLOGG BROWN & ROOT LLC, Houston, TX (US)

(72) Inventors: Steve Arthur Tragesser, Houston, TX (US); Matthew James Griffiths, Arlington Heights, IL (US); Narinder Singh Duggal, Haryana (IN); Rahul Saxena, Haryana (IN); Akhilesh Pratap, Sugar Land, TX (US)

(73) Assignee: KELLOGG BROWN & ROOT LLC, Houston, TX (US)

(*) Notice: Subject to any disclaimer, the term of this patent is extended or adjusted under 35 U.S.C. 154(b) by 492 days.

(21) Appl. No.: 17/990,117

(22) Filed: Nov. 18, 2022

(65) Prior Publication Data
US 2024/0166954 A1    May 23, 2024

(51) Int. Cl.
*B01J 8/26* (2006.01)
*B01J 4/00* (2006.01)
(Continued)

(52) U.S. Cl.
CPC ........... *C10G 11/182* (2013.01); *B01J 8/1872* (2013.01); *B01J 8/26* (2013.01);
(Continued)

(58) Field of Classification Search
CPC ............ C10G 11/182; C10G 2300/701; C10G 11/18; B01J 8/1872; B01J 8/26;
(Continued)

(56) References Cited

U.S. PATENT DOCUMENTS

| 6,143,253 | A | 11/2000 | Radcliffe et al. |
| 7,273,960 | B2 * | 9/2007 | Lattner ............. B01J 29/85 585/638 |

(Continued)

FOREIGN PATENT DOCUMENTS

WO    2010074891 A2    7/2010

OTHER PUBLICATIONS

European Patent Office, European Search Report dated Apr. 29, 2024 for European Application No. 23000163.8 filed Nov. 17, 2023; 7 pages.

*Primary Examiner* — Huy Tram Nguyen
(74) *Attorney, Agent, or Firm* — Gary Machetta

(57) ABSTRACT

A system for processing a selected feedstock using a catalyst includes a reactor, a catalyst recovery system, and a conduit. The reactor receives the catalyst and the selected feedstock. A reaction between the selected feedstock and the catalyst generates a spent catalyst. The catalyst recovery system processes the spent catalyst. The conduit connects the reactor to the catalyst recovery system and has a lateral section. The spent catalyst flows from the reactor through a flow space defined by an inner wall of the lateral section to the catalyst recovery system. The system also includes a fluidizer positioned at the lateral section. The fluidizer includes at least one nozzle. The at least one nozzle is completely inside the flow space. The at least one nozzle forms and directs a jet of a fluidizing agent into the spent catalyst in the lateral section.

15 Claims, 5 Drawing Sheets

(51) Int. Cl.
 *B01J 8/18* (2006.01)
 *C10G 11/18* (2006.01)
(52) U.S. Cl.
 CPC .............. *B01J 2208/00938* (2013.01); *B01J 2219/0036* (2013.01); *C10G 2300/701* (2013.01)
(58) Field of Classification Search
 CPC ...... B01J 2208/00938; B01J 2219/0036; B01J 4/002; B01J 8/0025; B01J 8/1818
 USPC ........................................................ 422/144
 See application file for complete search history.

(56) References Cited

U.S. PATENT DOCUMENTS

| | | |
|---|---|---|
| 2005/0118076 A1 | 6/2005 | Lomas |
| 2011/0058989 A1 | 3/2011 | Couch et al. |
| 2019/0193041 A1 | 6/2019 | Panchal |

\* cited by examiner

Section A-A

Section 'A-A'

FLUIDIZATION OF CATALYST IN LATERAL SECTIONS OF A SYSTEM

TECHNICAL FIELD

The present disclosure relates to maintaining adequate fluidization of catalyst flowing from a reactor to an external spent catalyst stripper.

BACKGROUND

Fluid catalytic crackers ("FCC") are a mainstay in the conversion of raw hydrocarbons into one or more preferred products. A typical FCC generally includes such as riser reactors, spent catalyst strippers, and regenerators. One or more feedstocks are added to the reactor and one or more catalysts are circulated in the reactor. The reactor is maintained at an elevated temperature and/or pressure. The cracking of the hydrocarbons within the riser reactor produces cracked hydrocarbons and carbonaceous coke, which becomes deposited on the surface of the catalyst. The coke deposits, along with other causes, deactivate the catalyst after passage through the riser reactor. After exiting the riser reactor, the cracked hydrocarbons and the coked catalyst are separated in a separation system, which may include cyclones. The separated coked catalyst is then introduced to one or more spent catalyst strippers where valuable hydrocarbon products/coke-precursors are separated from the catalyst. The catalyst is then sent to the regenerator in which coked catalyst is regenerated and prepared for recirculation to the riser.

In some configurations, a lateral section may be used to flow the fluidized catalyst from the reactor/disengagement vessel to an external stripper located on the side of the reactor. Improper fluidization in the lateral section may impair operation of devices such as a spent catalyst slide valve (SCSV). By way of example, insufficient fluidization may cause a loss in differential pressure, which may affect the function of devices that rely on differential pressure to operate as intended. A lateral section leading to an external stripper is merely one example of where improper fluidization can occur. The present disclosure addresses the need for proper fluidization in conduits such as lateral sections, as well as other fluid conveying structures.

SUMMARY

In aspects, the present disclosure provides a system for processing a selected feedstock using a catalyst. The system may include a reactor, a catalyst recovery system, and a conduit. The reactor receives the catalyst and the selected feedstock and a reaction between the selected feedstock and the catalyst generates a spent catalyst. The catalyst recovery system processes the spent catalyst. The conduit connects the reactor to the catalyst recovery system and has a lateral section. The spent catalyst flows from the reactor through a flow space defined by an inner wall of the lateral section to the catalyst recovery system. The system also includes a fluidizer positioned at the lateral section. The fluidizer includes a distributor in fluid communication with at least one nozzle. The at least one nozzle is completely inside the flow space and at least a portion of the distributor is inside the flow space. The at least one nozzle forms and directs a jet of a fluidizing agent into the spent catalyst in the lateral section.

In further aspects, the present disclosure provides a method for processing a selected feedstock using a catalyst. The method may include configuring a reactor to receive the catalyst and the selected feedstock, wherein a reaction between the selected feedstock and the catalyst generates a spent catalyst; configuring a catalyst recovery system to process the spent catalyst; connecting the reactor to the catalyst recovery system with a conduit, the conduit having a lateral section, wherein the spent catalyst flows through a flow space defined by an inner wall of the lateral section; and directing a jet of a fluidizing agent into the spent catalyst in the lateral section using a fluidizer positioned at the lateral section, the fluidizer including a distributor in fluid communication with at least one nozzle, wherein the at least one nozzle is completely inside the flow space and at least a portion of the distributor is inside the flow space, wherein the at least one nozzle is configured to form and direct a jet of a fluidizing agent into the spent catalyst in the lateral section.

In still further aspects, the present disclosure provides an apparatus for use with a system as described above for processing a selected feedstock. The apparatus may include a fluidizer positioned at the lateral section. The fluidizer includes a distributor in fluid communication with at least one nozzle. The at least one nozzle is completely inside the flow space and at least a portion of the distributor is inside the flow space. The at least one nozzle forms and directs a jet of a fluidizing agent into the spent catalyst in the lateral section.

It should be understood that certain features of the disclosure have been summarized rather broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description taken in conjunction with the accompanying drawings, in which like elements have been given like numerals and wherein.

DETAILED DESCRIPTION

Figure 1:
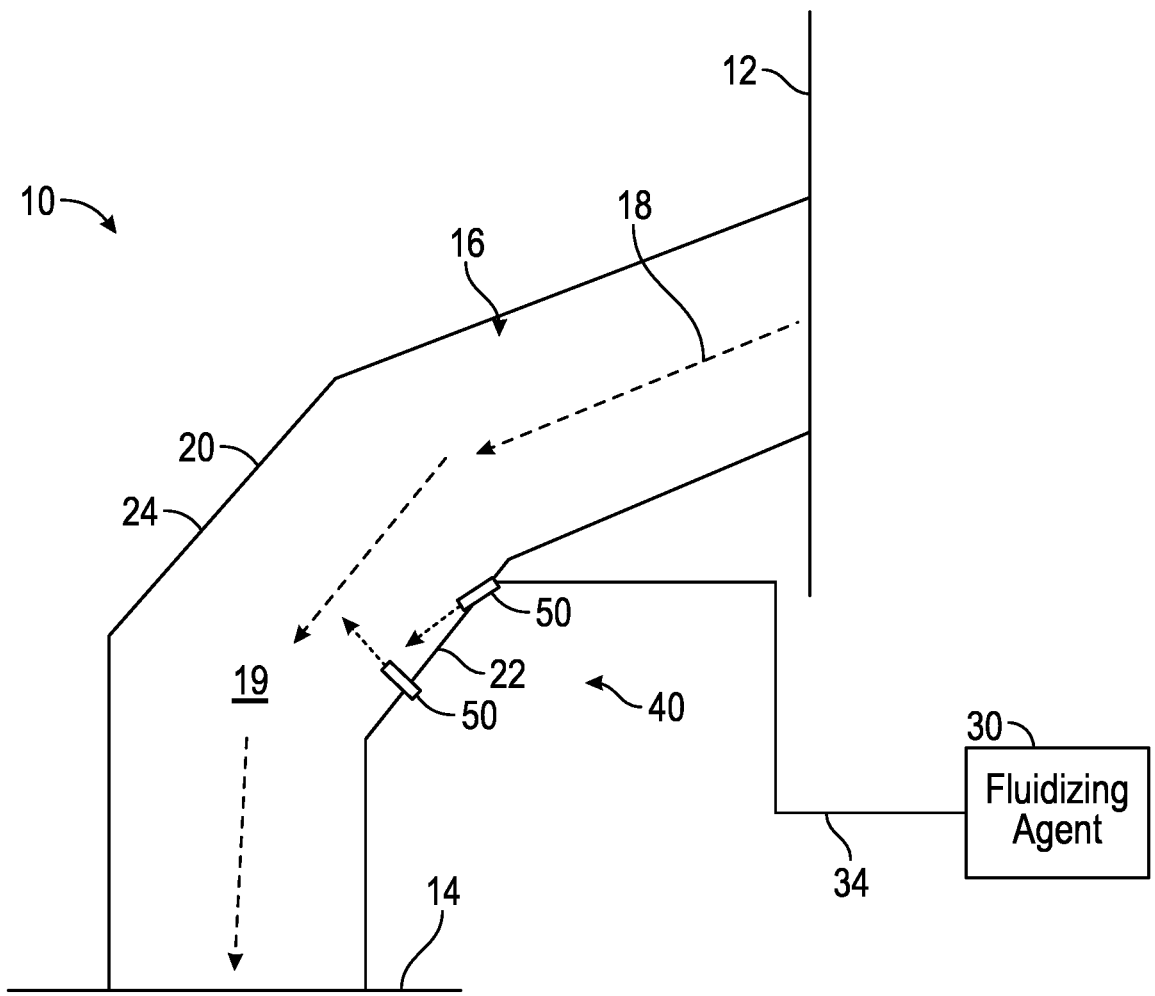
FIG. 1 is a schematic illustration of a non-limiting embodiment of a fluidizer in accordance with one embodiment of the present disclosure.

In aspects, the present disclosure provides systems and related methods for maintaining fluidity of spent catalyst flowing from a reactor to a stripper through the lateral section. A spent catalyst is one non-limiting material that is fluidized to facilitate flow. Likewise, a reactor and a stripper are non-limiting examples of locations between which a fluidized material can flow. Thus, in further aspects, the present disclosure provides systems and related methods for maintaining fluidity of along a non-vertical conduit conveying a fluidizing material between two or more locations. The present disclosure is susceptible to embodiments of different forms. There are shown in the drawings, and herein will be described in detail, specific embodiments of the present disclosure with the understanding that the present disclosure is to be considered an exemplification of the principles of the disclosure and is not intended to limit the disclosure to that illustrated and described herein.

Referring to FIG. 1, there is schematically shown a processing system 10, such as a FCC unit, that includes a reactor or disengagement vessel 12 and a spent catalyst stripper 14. Inside the reactor 12, spent catalyst 18 flows from a riser termination device (not shown) and/or cyclone diplegs (not shown) to a fluidized bed (not shown). A conduit 16 conveys the spent catalyst 18 from the reactor 12 to the stripper 14. In embodiments, the conduit 16 includes a lateral section 20. As used herein, a "lateral" section is a section in which catalyst flows in a non-vertical direction.

In embodiments, a fluidizer 40 positioned at the conduit 16 may be used to form jets of a fluidizing agent that maintain a desired level of fluidization in the conduit 16. Suitable fluidizing agents include, but are not limited to, air, gas, gas mixtures, gases, inert gases, or steam. By fluidization, it is meant that the catalyst 18 flows without occluding in a manner that reduces pressure differentials needed for equipment such as a spent catalyst slide valve (SCSV, not shown) to operate as intended. For example, catalyst circulation can fluctuate, which is not desirable as continuous catalyst circulation is required to efficiently convert the feed. The fluidizing agent may be supplied from a fluidizing agent source 30 to the fluidizer 40 using one or more flow lines 34.

In one arrangement, the fluidizer 40 may include one or more nozzles 50 disposed along a bottom wall 22 of the lateral section 20. By "bottom," it is meant a wall of the lateral section 20 at the lowest elevation. The nozzles 50 may protrude into a flow space 19 of the conduit 16. The radially innermost surfaces of the conduit 16 define the flow space 19. The conduit 16 has a refractory lining (not shown) or another suitable metal protection coating or lining. In some embodiments, the nozzle 50 may generate a jet of the fluidizing agent that is generally aligned with the flow of the catalyst 18. By "aligned," it is meant that a component of the vector of the jet is parallel with and in the same direction as the flow of the catalyst 18. Thus, the direction of the jet may be angled as shown, and still be 'aligned' for the purposes of the present disclosure. In other embodiments, the nozzle 50 generates a jet of the fluidizing agent that is perpendicular to the bottom wall 22. It should be appreciated that the fluidizer 40 and nozzle(s) 50 are susceptible to numerous variants. For example, the number of nozzles 50 in an array may vary. Similarly, various geometric patterns may be used to array the nozzles 50. Likewise, the direction in which the fluidizing agent jets enter the flow path 26 may vary. That is, one array may include several nozzles 50, with two or more nozzles 50 pointing in different directions. Also, the nozzles 50 may be located on other wall sections, e.g., top wall, side walls, etc.

In the FIG. 1 embodiment, the fluidizer 40 be in fluid communication with a receive the fluidizing agent from fluid lines or pipes that are external to the conduit 16. During operation, the fluidizing agent flows from the fluidizing agent source 30 via the flow line 34 to the fluidizer 40. The nozzle(s) 50 of the fluidizer 40 form and direct jets of the fluidizing agent into the catalyst 18 inside the lateral section 20.

Several other non-limiting embodiments of the fluidizer 40 are described below.

Figure 2B:
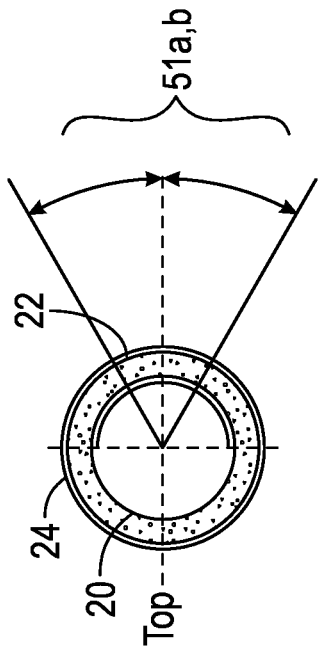
FIGS. 2A-C illustrate a fluidizer in accordance with an embodiment of the present invention that uses a fluidizing jet aligned with the flow of catalyst.
Figure 2C:
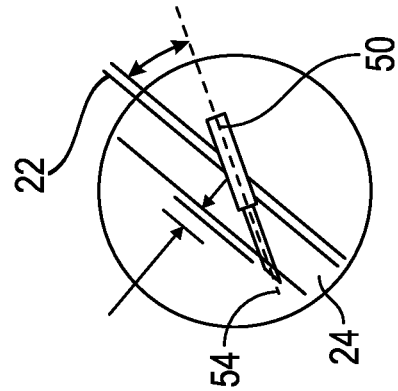
Figure 2A:
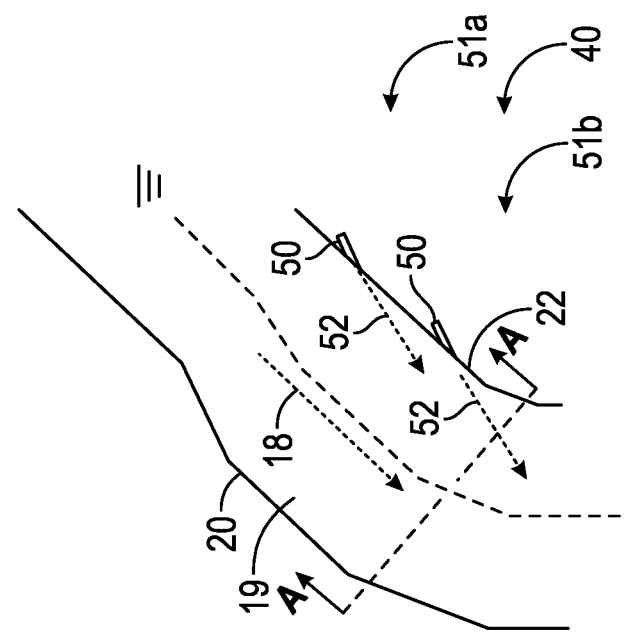

Referring to FIGS. 2A-C, there is shown a fluidizer 40 that includes a plurality of nozzles 50 configured to form jets 52 of a fluidizing agent. The jets 52 are generally aligned with the flow of the catalyst 18 in the flow path 19. In this non-limiting arrangement, the fluidizer 40 is formed of an array of nozzles 50 that includes a first nozzle set 51a and a second nozzle set 51b. As best seen in FIG. 2B, each set 51a,b may include angularly offset nozzles (not show) positioned an a transverse plane and along a portion of the bottom wall 22. Such a position may be preferable in situations where catalyst is expected to settle, clump together, or otherwise obstruct flow at or near the bottom wall 22. However, in other arrangements, the nozzles 50 may be located along other sections of the lateral section 20.

Referring still to FIG. 2B, the lateral section 20 may include a refractory lining 24 that protects the underlying surfaces from erosion, thermal degradation, and other damage that could otherwise be caused by the catalyst 18. Referring to FIG. 2C, a tip 54 of the nozzle 50 may be configured to protrude through the refractory lining 24. While two equally spaced-apart nozzles 50 are shown in the set, other sets may include greater or fewer nozzles 50. The arrays may also utilize symmetric or asymmetric relative positioning for the nozzles. Like in the FIG. 1 embodiment, a fluidizing agent may be supplied to the fluidizer 40 from a flow line 34 (FIG. 1) that is external to the conduit 16. Thus, only portions of the nozzles 50 reside in the flow space 19.

Figure 3:
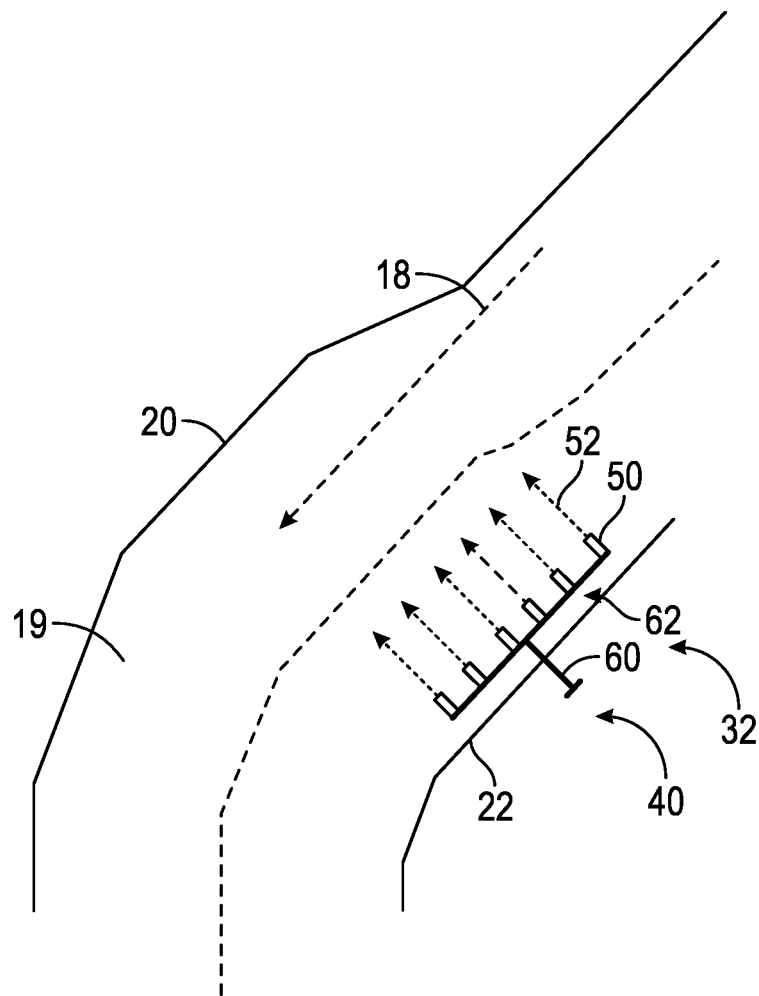
FIG. 3 illustrates a fluidizer in accordance with an embodiment of the present disclosure using a linear array of nozzles.

Referring to FIG. 3, there is shown another fluidizer 40 in accordance with the present disclosure. In this embodiment, the fluidizer 40 includes a distributor 32. The distributor 32 may have an inlet 60, an internal line 62, and one or more nozzles 50. The inlet 60 penetrates through the bottom wall 22 of the lateral section 20. The inlet 60 connects to and is in fluid communication with the internal line 62, which may run axially along the lateral section 20. The nozzles 50 may be arrayed along the internal line 62 to generate associated jets 52. Thus, the internal line 62 of the distributor 32 is configured to distribute fluidizing agent to two or more nozzles 50. While six equally spaced-apart nozzles 50 are shown for the array, other arrays may include greater or fewer nozzles 50. Also, in a variant not illustrated, branch arms may be connected to the internal line 62. These branch arms may be curved to complement the inside wall of a lateral section 20 having a circular-cross section. In such a variant, the branch arms may share a common internal line 62. The nozzles may be arrayed along the branch arms to direct jets of fluidizing agents into the flow path 19. It should be noted that the FIG. 3 embodiment utilizes a distributor 32 that is partially positioned inside the flow space 19. Thus, in the FIG. 3 embodiment, the nozzles 50 and the internal line 62 of the distributor 32 are completely inside the flow space 19. During operation, the fluidizing agent flows from the fluidizing agent source 30 (FIG. 1) via the flow line 34 (FIG. 1) to the fluidizer 40. Using the inlet 60 and internal line 62, the distributor 32 distributes the fluidizing agent to the nozzle(s) 50 of the fluidizer 40.

Figure 4A:
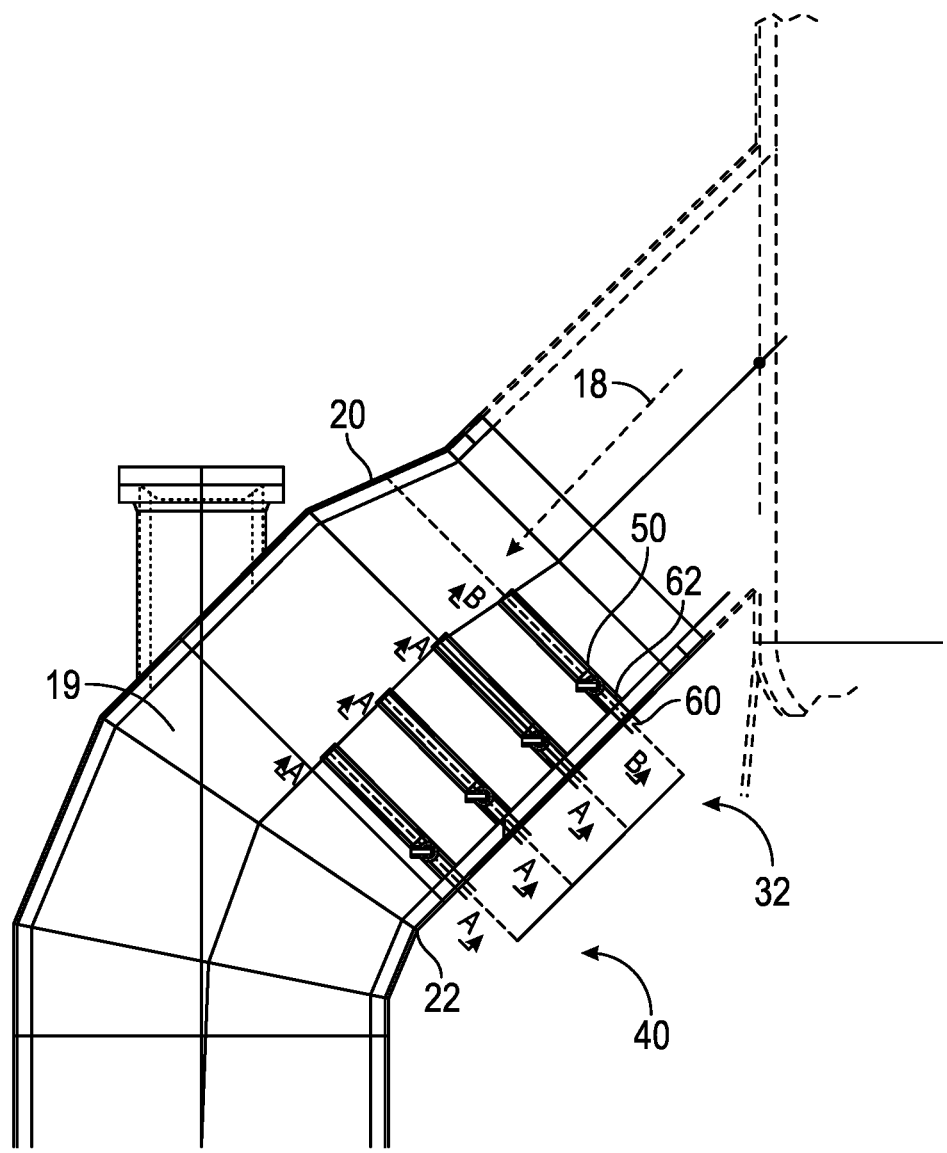
FIGS. 4A-C illustrate other fluidizers in accordance with the present disclosure.
Figure 4B:
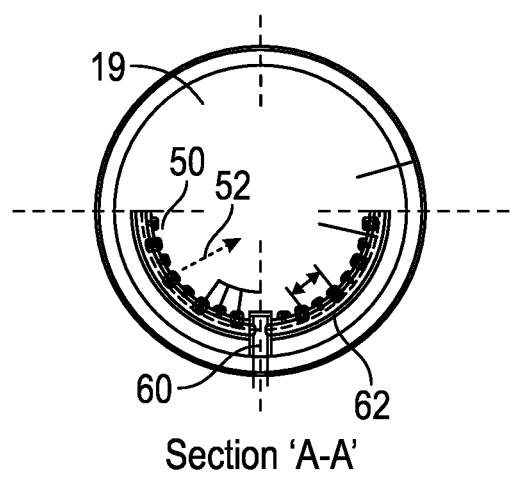

Referring to FIGS. 4A-B, there is shown yet another fluidizer 40 in accordance with the present disclosure. In this embodiment, the fluidizer 40 includes a plurality of internal lines 62, each of which is in fluid communication with an associated inlet 60 that penetrates through the bottom wall 22 of the lateral selection 20. In a variant not shown, two or more internal lines 62 may share a common inlet 60. While four equally spaced apart internal lines 62 are shown, other arrays may include greater or fewer internal lines 62. The internal lines 62 may be formed as curved, semicircular tubular members. Other shapes may be used, depending on the geometry of the internal surface of the lateral section 20. As best seen in FIG. 4B, the nozzles 50 may be arrayed along the internal line 62. The nozzles 50 may be configured to generate jets 52 that are generally perpendicular to the flow of the catalyst 18 (FIG. 4A). However, other directions for the jets 52 may be used. Like the FIG. 3 embodiment, the embodiment of FIGS. 4A-B utilizes a distributor 32 that is partially positioned inside the flow space 19. That is, the nozzles 50 and the internal line 62 on which they are disposed are completely inside the flow space 19.

Figure 4C:
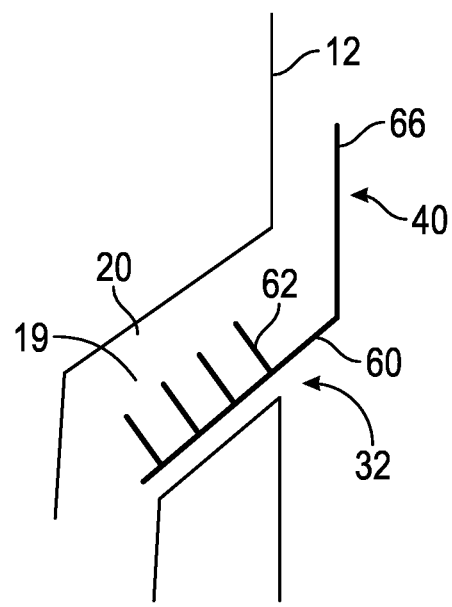

Referring to FIG. 4C, there is shown yet another embodiment according to the present disclosure. In this arrangement, the fluidizer 40 includes a plurality of internal lines 62, all of which are in fluid communication with an inlet 60. The inlet 60 is in communication with a flow line 66 that runs at least partially along an interior of the reactor 12. The flow line 66 may receive the fluidizing agent from the fluidizing source 30 (FIG. 1). The flow line 66 may be in fluid communication with the flow line 34 (FIG. 1). In this embodiment, the nozzles (not shown) and the internal lines 62 and the inlet 60 of the distributor 32 are positioned completely inside the flow space 19.

The fluidizers 40 according to the present disclosure may be operated in numerous modes. In some modes, the fluidizer 40 may operate continuously. In other modes, the fluidizer 40 may operate in response to control signal issued by a human operator or a control unit. That is, a fluidizer 40 may be activated as needed.

From the above, it should be appreciated that what has been described includes a system for processing a selected feedstock using a catalyst. The system may include a reactor, a catalyst recovery system, and a conduit. The reactor receives the catalyst and the selected feedstock. A reaction between the selected feedstock and the catalyst generates a spent catalyst. The catalyst recovery system processes the spent catalyst. The conduit having a lateral section connects the reactor to the catalyst recovery system. The spent catalyst flows through a flow space defined by an inner wall of the lateral section. The system also includes a fluidizer positioned at the lateral section. The fluidizer includes a distributor in fluid communication with one or more nozzles. The nozzle(s) forms and directs a jet of a fluidizing agent into the spent catalyst in the lateral section.

From the above, it should be appreciated that what has been described also includes a method for processing a selected feedstock using a catalyst. The method may include configuring a reactor to receive the catalyst and the selected feedstock, wherein a reaction between the selected feedstock and the catalyst generates a spent catalyst; configuring a catalyst recovery system to process the spent catalyst; connecting the reactor to the catalyst recovery system with a conduit, the conduit having a lateral section, wherein the spent catalyst flows through a flow space defined by an inner wall of the lateral section; and directing a jet of a fluidizing agent into the spent catalyst in the lateral section using a fluidizer positioned at the lateral section, the fluidizer including a distributor in fluid communication with one or more nozzles, wherein the nozzle(s) is completely inside the flow space and at least a portion of the distributor is inside the flow space, wherein the nozzle(s) is configured to form and direct a jet of a fluidizing agent into the spent catalyst in the lateral section.

From the above, it should be appreciated that what has been described also includes an apparatus that can be retrofitted into a preexisting system for processing a selected feedstock using a catalyst. The preexisting system may include a reactor, a catalyst recovery system, and a conduit. The reactor receives the catalyst and the selected feedstock. A reaction between the selected feedstock and the catalyst generates a spent catalyst. The catalyst recovery system processes the spent catalyst. The conduit has a lateral section and connects the reactor to the catalyst recovery system. The spent catalyst flows through a flow space defined by an inner wall of the lateral section.

For a retrofit, the apparatus may include a fluidizer that is added to the lateral section. The fluidizer includes a distributor in fluid communication with one or more nozzles. The nozzle(s) is completely inside the flow space and at least a portion of the distributor is inside the flow space. The nozzle(s) forms and directs a jet of a fluidizing agent into the spent catalyst in the lateral section.

From the above, it should be appreciated that what has been described includes a system for conveying solid particulates between a first location and a second location. The system may include a conduit having a lateral section that connects the first location to the second location. The solid particulates flow through a flow space defined by an inner wall of the lateral section. The system also includes a fluidizer positioned at the lateral section. The fluidizer includes a distributor in fluid communication with the nozzle(s). The nozzle(s) forms and directs a jet of a fluidizing agent into the solid particulates in the lateral section.

As noted above, a "lateral" section is a section in which catalyst flows in a non-vertical direction. In some situations, the angular deviation of the lateral section from a vertical reference may impede the flow of the catalyst to a degree that equipment, such as flow control devices (e.g., valves), cannot operate as intended. In other situations, the angular deviation of the lateral section from a vertical reference may cause a pressure differential across the lateral section to vary from a predetermined norm (e.g., fall outside a predetermined range, exceed a predetermined upper limit, fall below a lower limit, etc.). In still other situations, the angular deviation of the lateral section from a vertical reference may also cause a flow parameter, such as flow rate, to vary from a predetermined norm (e.g., fall outside a predetermined range, exceed a predetermined upper limit, fall below a lower limit, etc.).

As used throughout, fluidizing means causing solid particulates to acquire the characteristics of a fluid by using a fluidizing agent.

The words "comprising" and "comprises" as used throughout the claims, are to be interpreted to mean "including but not limited to" and "includes but not limited to", respectively.

To the extent used herein, the word "substantially" shall mean "being largely but not wholly that which is specified."

As used herein, the singular forms "a," "an," and "the" are intended to include the plural forms as well, unless the context clearly indicates otherwise.

To the extent used herein, the term "about" in reference to a given parameter is inclusive of the stated value and has the meaning dictated by the context (e.g., it includes the degree of error associated with measurement of the given parameter).

To the extent used herein, the term "and/or" includes any and all combinations of one or more of the associated listed items.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

We claim:

1. A system for processing a selected feedstock using a catalyst, comprising:
    a reactor configured to receive the catalyst and the selected feedstock, wherein a reaction between the selected feedstock and the catalyst generates a spent catalyst;
    a catalyst recovery system configured to process the spent catalyst;
    a conduit connecting the reactor to the catalyst recovery system, the conduit having a lateral section, wherein the spent catalyst flows through a flow space defined by an inner wall of the lateral section; and
    a fluidizer positioned at the lateral section, the fluidizer including a distributor in fluid communication with at least one nozzle, wherein the at least one nozzle is completely inside the flow space and at least a portion of the distributor is inside the flow space, wherein the at least one nozzle is configured to form and direct a jet of a fluidizing agent into the spent catalyst in the lateral section.

2. The system of claim 1, wherein the at least one nozzle includes a plurality of nozzles, wherein the distributor includes an internal line on which the plurality of nozzles is positioned, wherein the internal line is completely inside the flow space.

3. The system of claim 2, wherein the distributor includes an inlet protruding through the inner wall of the lateral section, the inlet being in fluid communication with the internal line.

4. The system of claim 1, wherein the at least one nozzle includes a plurality of nozzles, wherein the distributor includes a plurality of internal lines, wherein each internal line includes at least one nozzle of the plurality of nozzles, and wherein each internal line is completely inside the flow space.

5. The system of claim 4, wherein each internal line includes an inlet protruding through the inner wall of the lateral section, each inlet being in fluid communication with the associated internal line.

6. The system of claim 1, wherein the at least one nozzle directs the jet in a direction selected from one of: aligned with a flow of the catalyst in the lateral section and perpendicular to the flow of the catalyst in the lateral section.

7. The system of claim 1, wherein the distributor includes a flow line conveying the fluidizing agent from a fluidizing agent source to the at least one nozzle, and wherein the flow line runs at least partially along an interior of the reactor.

8. The system of claim 1, wherein the at least one nozzle includes a plurality of nozzles, wherein the distributor includes an internal line and a plurality of branch arms in fluid communication with the internal line, and wherein the plurality of nozzles are positioned on the branch arms, wherein the internal line and the plurality of branch arms are completely inside the flow space.

9. A method for processing a selected feedstock using a catalyst, comprising:
    configuring a reactor to receive the catalyst and the selected feedstock, wherein a reaction between the selected feedstock and the catalyst generates a spent catalyst;
    configuring a catalyst recovery system to process the spent catalyst;
    connecting the reactor to the catalyst recovery system with a conduit, the conduit having a lateral section, wherein the spent catalyst flows through a flow space defined by an inner wall of the lateral section; and
    directing a jet of a fluidizing agent into the spent catalyst in the lateral section using a fluidizer positioned at the lateral section, the fluidizer including a distributor in fluid communication with at least one nozzle, wherein the at least one nozzle is completely inside the flow space and at least a portion of the distributor is inside the flow space, wherein the at least one nozzle is configured to form and direct a jet of a fluidizing agent into the spent catalyst in the lateral section.

10. The method of claim 9, wherein the at least one nozzle includes a plurality of nozzles, wherein the distributor includes an internal line on which the plurality of nozzles is positioned, wherein the internal line is completely inside the flow space.

11. The method of claim 9, wherein the at least one nozzle includes a plurality of nozzles, wherein the distributor includes a plurality of internal lines, wherein each internal line includes at least one nozzle of the plurality of nozzles, and wherein each internal line is completely inside the flow space.

12. The method of claim 9, wherein each internal line includes an inlet protruding through the inner wall of the lateral section, each inlet being in fluid communication with the associated internal line.

13. The method of claim 9, wherein the distributor includes an internal line on which the at least one nozzle is positioned, wherein the internal line is completely inside the flow space.

14. The method of claim 13, wherein each internal line is curved.

15. An apparatus for use with a system for processing a selected feedstock using a catalyst, the system including a reactor configured to receive the catalyst and the selected feedstock, wherein a reaction between the selected feedstock and the catalyst generates a spent catalyst; a catalyst recovery system configured to process the spent catalyst; and a conduit connecting the reactor to the catalyst recovery system, the conduit having a lateral section, wherein the spent catalyst flows through a flow space defined by an inner wall of the lateral section, the apparatus comprising:
    a fluidizer configured to be positioned at the lateral section, the fluidizer including a distributor in fluid communication with at least one nozzle, wherein the at least one nozzle is completely inside the flow space and at least a portion of the distributor is inside the flow space, wherein the at least one nozzle is configured to form and direct a jet of a fluidizing agent into the spent catalyst in the lateral section.

* * * * *